May 2, 1950  J. J. SMITH  2,505,801
SHEARING MACHINE
Filed Dec. 13, 1945  2 Sheets-Sheet 1

INVENTOR.
John J. Smith
BY
M. C. Hayes
ATTORNEY

May 2, 1950      J. J. SMITH      2,505,801

SHEARING MACHINE

Filed Dec. 13, 1945      2 Sheets-Sheet 2

INVENTOR.
John J. Smith
BY M. O. Hayes
ATTORNEY

Patented May 2, 1950

2,505,801

UNITED STATES PATENT OFFICE 2,505,801

SHEARING MACHINE

John J. Smith, Philadelphia, Pa.

Application December 13, 1945, Serial No. 634,876

6 Claims. (Cl. 164—47)

(Granted under the act of March 3, 1883, as amended April 30, 1928; 370 O. G. 757)

This invention relates to shearing machines and more particularly to means adapted to support and guide standard structural beams during the machining of the latter.

Girders in the shape of I or H beams having lengths up to forty feet are standard equipment for heavy industry, shipping, large buildings, etc. The I beams are trimmed frequently into channel, angle, T or Z beams, and the like, and accuracy and speed of trimming are factors that are highly sought.

It is an object of the present invention to provide means for accurately holding and guiding girder beams on a cutting machine while the beams are being machined.

Another object is to provide adjustable holding means permitting beams to be held at various positions on the cutting machine, so as to allow for the trimming of different-size flanges from the beams.

Another object is to provide an adjustable holder means that will permit a continuous trimming of a beam without altering the setting of the holding means.

Another object is to provide novel holding means that eliminates the wasteful step of "backmarking" beams prior to their being trimmed.

Further objects and advantages of this invention, as well as its construction, arrangement and operation, will be apparent from the following description and claims in connection with the accompanying drawings, in which Fig. 1 is a horizontal plan, partly in section, of an embodiment of the present holding means shown in conjunction with a shearing machine;

Figure 1:
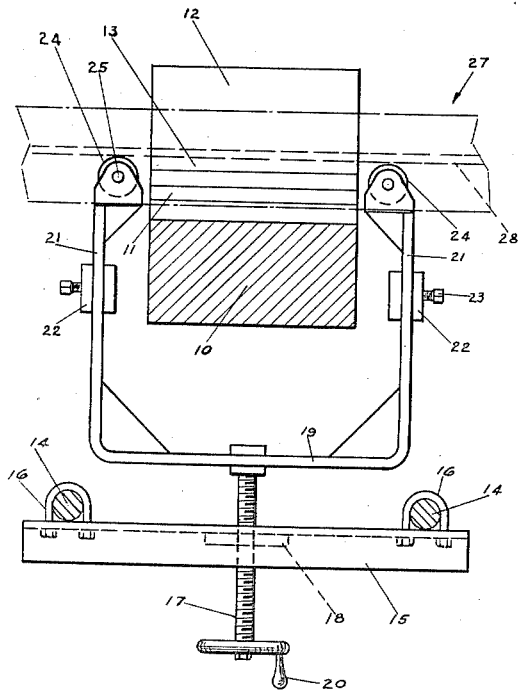
Figure 2:
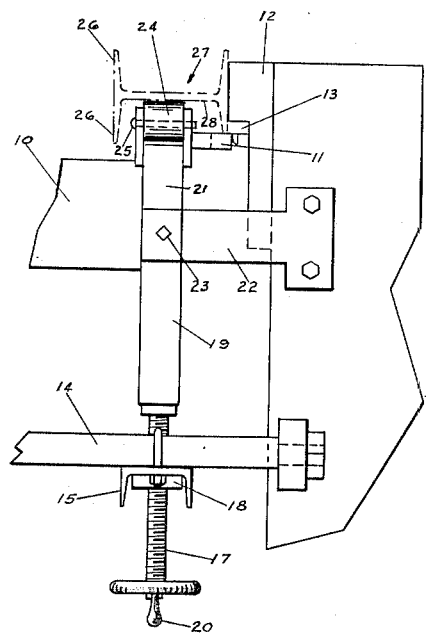
Fig. 2 is a side elevation of the same.
Figure 3:
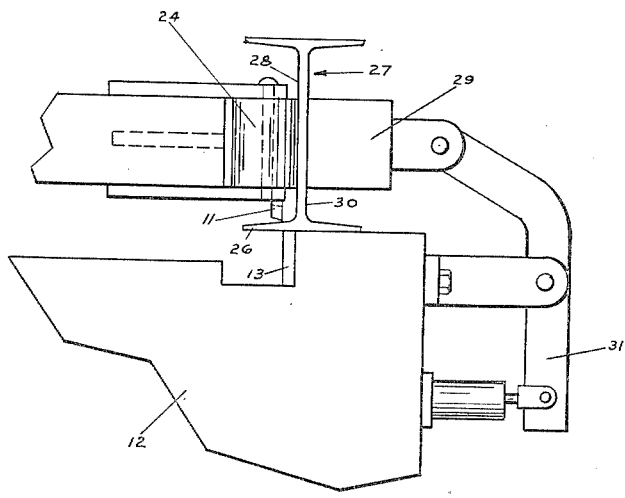
Fig. 3 is a side elevation view, in detail, of a portion of the present holding means.

Figs. 1 and 2 show the bolster 10 of a power-driven jack or punch drill that supports a cutting blade 11, the latter being adapted to be driven by suitable power means within the bolster 10 against a non-movable blade 13. The body 12 of the power jack or punch drill supports another and non-movable blade 13 so located on the body 12 that the blade 11 will slide past the fixed blade 13 in scissor-like fashion to shear off material held between the cutting edges of the blades.

A pair of parallel stanchions 14 support a strongback 15; U-clamps 16 are bolted or otherwise fixed detachably to the strongback 15 and to the stanchions 14 to allow for adjustment of the strongback 15 relative said stanchions. A feed-screw 17 is mounted centrally on a threaded supporting member 18 secured to the strongback 15. The center of a substantially U-shaped frame 19 is secured to the foot of the feed screw 17 so that the turning of the screw handle 20 causes the frame 19 to move in a path normal to the plane of said stanchions. Two screws can be geared to a center shaft when a more positive setting of the frame 19 is desired.

The arms 21 of the frame 19 are nested near their ends in supports or guide posts 22, setscrews 23 fixing the arms 21 onto their respective supports 22 after the frame 19 has been moved a predetermined distance. The tip of each arm 21 has a C-shape configuration and a roller 24 rotates about a pin 25 that passes through the parallel elements of the C-shape tip and through the roller 24.

Figures 6, 7:
Fig. 6 is a left side view of Fig. 5.
Fig. 7 shows a T beam formed after shearing.

In practice, the flanges 26 of the I beam 27 (Fig. 6) are to be cut according to specification. When prescribed lengths of the flange 26 are to be sheared, the arms 21 are urged forward by turning the handle 20 sufficiently to urge the rollers 24 to a position that engages the bosom 28 of the beam 27 so as to limit the amount of flange portion that will be sheared by the blades 12 and 13. The countersupport or buttress 29 engages the opposite bosom 30 of the beam 27 being trimmed, the countersupport 29 preferably being operable by a compressed-air jack 31 so that the countersupport 29 can be readily engaged to or disengaged from the bosom 30 of the beam 27.

After the arms 21 have been set to the position that permits the rollers 24 to abut the bosom 28 of the beam 27 and keep a predetermined portion of a flange 26 between the cutting blades 12 and 13, the beam 27 is fed between the cutting blades and against the rollers 24, the air jack 31 is activated to engage the bosom 29 of the beam 27 and counteract the force of the rollers 24, and the blade 11 of the bolster 10 is urged downward to shear off the required width of flange along a portion of the length of the beam. When this cut has been taken, the air pressure is removed from the air jack 31, releasing the latter from its engagement with the beam 27, permitting more of the beam to be fed between the cutting blades; air pressure is reapplied to the air jack 31 to re-engage the beam 27; and another cut is taken along the length of the beam, the process continuing until the entire length of beam is sheared. In a similar manner, any other flange of the beam can be cut by this method.

The only marking necessary is a short line or a single point on the forward edge of the beam 27 to check the adjustment of the arms 21 immediately before the initial cut is made in the beam 27. After the arm 21 adjustments have been made and the rollers 24 and the countersupport 29 have been urged against the opposite bosoms 28 and 30 respectively of the beam 27, the operator can check on the accuracy of the adjustments by noting if the short line or point lies in the same plane as the movable cutting blade 11.

Figure 4:
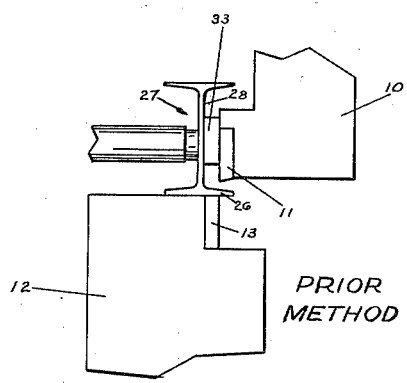
Fig. 4 is a schematic view of a prior method of cutting an I beam.
Figure 5:
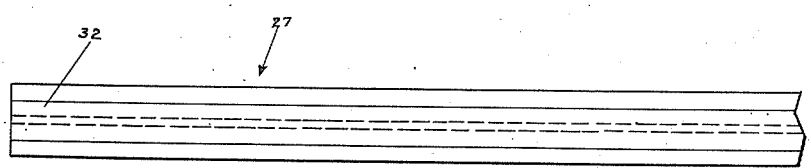
Fig. 5 is a top view of an I beam with a template superimposed.

A former method for shearing the beam 27 began with the superimposition of a template 32 (see Figs. 5 and 6) over an outer face of the beam 27. Chalk lines were drawn, using the side edges of the template 32 as guiding lines. It was then necessary to transfer this chalk line or shear line onto the inner face of the beam because the shearing operation began on the inner face of the beam 27. The need for the backmarking or the transferring of the shear line from the outer face to the inner face of the beam 27 becomes more apparent when reference is made to Fig. 4. There is shown a prior method wherein a shim or wedge 33 was placed between the bosom 28 of the beam 27 and the side of the upper blade 11 so as to permit the predetermined width of flange 26 to be sheared. Obviously, the operator in charge of the shearing operation had to observe the chalk line and note how closely the shearing blade 11 coincided with the guide line on the inner face of the beam. Hence the need for backmarking each beam. If the cut were off the mark, the shim or wedge had to be replaced with a wedge of the proper width.

It should be apparent that the described former method entailed many wasteful steps, namely, the transfer of chalk lines from one face of a beam to its under side, the unsteady and repeated positioning and removal of a wedge during the shearing process, and the need to have different size wedges when different widths of flange were to be sheared from the base. Ragged sheared edges were the rule rather than the exception.

The present holder and guide eliminates the time-wasteful process of backmarking beams, considerably increases the speed with which beams are sheared, and insures a straight cut in the flange portion of the beam. The present holder is simple to operate, provides a steady support for beams of the type described, and provides positive means for increasing the production of channel, T, Z, angle beams, or other similarly modified beams.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A device adapted to support beams of the type described during the machining of the latter comprising a shearing element, parallel arms urgeable to move in one plane and adjustable in a plane normal to it, locking means for said parallel arms, rollers at the forward extremities of said arms and disposed at both sides of the shearing element, and a rigid element lying midway between said rollers and urgeable in a direction opposing the thrust of the parallel arms.

2. A device adapted to support beams during the machining of the latter comprising a shearing element, a unitary U-shaped element having a pair of parallel arms and rollers at the extremities of said arms, said rollers being disposed at both sides of the shearing element and adapted to engage the bosom portion of a beam so as to limit the width of beam flange exposed to said shearing element, means for urging said U-shaped element to and fro in a horizontal plane, a means for moving said U-shaped element in a vertical plane, supporting and guiding means for said arms, locking means for said arms, and an element adapted to engage the rear bosom of said beam so as to urge said beam in a direction opposing the thrust of the pair of parallel arms.

3. A device adapted to support beams during the machining of the latter comprising a shearing element, a pair of parallel arms linked to a common member, rollers at the extremities of said arms and disposed at both sides of the shearing element and adapted to engage the bosom position of a beam so as to limit the width of beam flange exposed to said shearing element, means for urging said arms to and fro in one plane and adjusting them in a plane normal to it, supporting and guiding means for said movable arms, locking means for said arms, and an air jack adapted to engage or disengage the rear bosom of a beam so as to urge said beam in a direction opposing the thrust of the parallel pair of arms.

4. A shearing machine comprising a shearing element, a unitary U-shaped element, means to move said U-shaped element in a plurality of planes, a plurality of rollers mounted on the ends of the arms of said U-shaped element, and an element adapted to oppose thrust of said rollers against a beam, whereby said beam is secured in operative relation to said shearing element.

5. A shearing machine comprising a shearing element, a unitary U-shaped element having parallel arms, means to move said U-shaped element in a plurality of planes, means to lock said U-shaped element in selected position, and a plurality of rollers mounted on said arms and adapted to engage a portion of the opposite bosom of said beam whereby said beam is secured in operative relation to said shearing element.

6. A device adapted to support a beam during the machining of the latter comprising a shearing element, a unitary U-shaped element carrying rollers at the extremities thereof, said rollers being disposed at both sides of the shearing element and being adapted to engage the bosom portion of a beam so as to limit the width of beam flange exposed to said shearing element, means for moving said U-shaped element vertically, supporting, guiding and locking means for said U-shaped element, a screw carried by said supporting means and adapted to feed said U-shaped element relative said shearing element, and an element adapted to engage the rear bosom of such beam so as to urge such beam in a direction opposing the thrust of said rollers.

JOHN J. SMITH.

REFERENCES CITED

The following references are of record in the file of this patent:

UNITED STATES PATENTS

| Number | Name | Date |
|---|---|---|
| 936,073 | Ames | Oct. 5, 1909 |
| 1,135,531 | Koehl | Apr. 13, 1915 |
| 1,715,244 | McMillan | May 28, 1929 |
| 2,145,405 | Schermerhorn | Jan. 31, 1939 |